(12) United States Patent
Onuki

(10) Patent No.: US 11,012,650 B2
(45) Date of Patent: May 18, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kenji Onuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 16/421,629

(22) Filed: May 24, 2019

(65) Prior Publication Data
US 2019/0373202 A1 Dec. 5, 2019

(30) Foreign Application Priority Data
May 30, 2018 (JP) .............................. JP2018-103670

(51) Int. Cl.
*H04N 5/3745* (2011.01)
*H04N 5/232* (2006.01)

(52) U.S. Cl.
CPC ..... *H04N 5/37455* (2013.01); *H04N 5/23212* (2013.01); *H04N 5/23229* (2013.01)

(58) Field of Classification Search
CPC ........... H04N 5/37455; H04N 5/23212; H04N 5/23229; H04N 5/232125; H04N 5/23232;
(Continued)

(56) References Cited

U.S. PATENT DOCUMENTS

2008/0118156 A1* 5/2008 Okada ................ H04N 5/23218
382/195
2009/0047010 A1* 2/2009 Yoshida ............... H04N 5/2356
396/127
(Continued)

FOREIGN PATENT DOCUMENTS

CN 101188677 A 5/2008
CN 101217623 A 7/2008
(Continued)

OTHER PUBLICATIONS

Oct. 4, 2019 European Search Report, which is enclosed, that issued in European Patent Application No. 19169725.9.
(Continued)

*Primary Examiner* — Nhan T Tran
(74) *Attorney, Agent, or Firm* — Cowan, Liebowitz & Latman, P.C.

(57) ABSTRACT

An image processing apparatus comprises a first calculation unit configured to calculate, for an input image, a first range that is within a depth of field from a focus position, a second calculation unit configured to calculate, for the input image, a second range that is within a depth of field from the focus position corresponding to an aperture value virtually changed by a predetermined amount from an aperture value employed to capture the input image; and a display control unit configured to display an area in the first range or the second range on display apparatus depending on an image capturing mode employed to capture the input image, such that the area in the first range or the second range is distinguishable from an area other than the area in the first range or the second range.

23 Claims, 11 Drawing Sheets

(58) Field of Classification Search
CPC ......... H04N 5/232935; H04N 5/23222; H04N 5/232133; H04N 5/232127
See application file for complete search history.

(56) References Cited

U.S. PATENT DOCUMENTS

| | | | |
|---|---|---|---|
| 2014/0176776 A1* | 6/2014 | Morita | H04N 5/232935 348/333.11 |
| 2014/0267869 A1* | 9/2014 | Sawa | H04N 5/232939 348/333.03 |
| 2014/0347541 A1* | 11/2014 | Okazaki | H04N 5/23216 348/333.02 |
| 2014/0354781 A1* | 12/2014 | Matsuyama | H04N 5/23212 348/49 |
| 2017/0318226 A1 | 11/2017 | Jung et al. | |

FOREIGN PATENT DOCUMENTS

| | | |
|---|---|---|
| CN | 103888657 A | 6/2014 |
| JP | 2016-004163 A | 1/2016 |
| JP | 2016-009062 A | 1/2016 |

OTHER PUBLICATIONS

Dec. 3, 2020 Chinese Office Action, which is enclosed with an English Translation, that issued in Chinese Patent Application No. 201910464500.3.

* cited by examiner

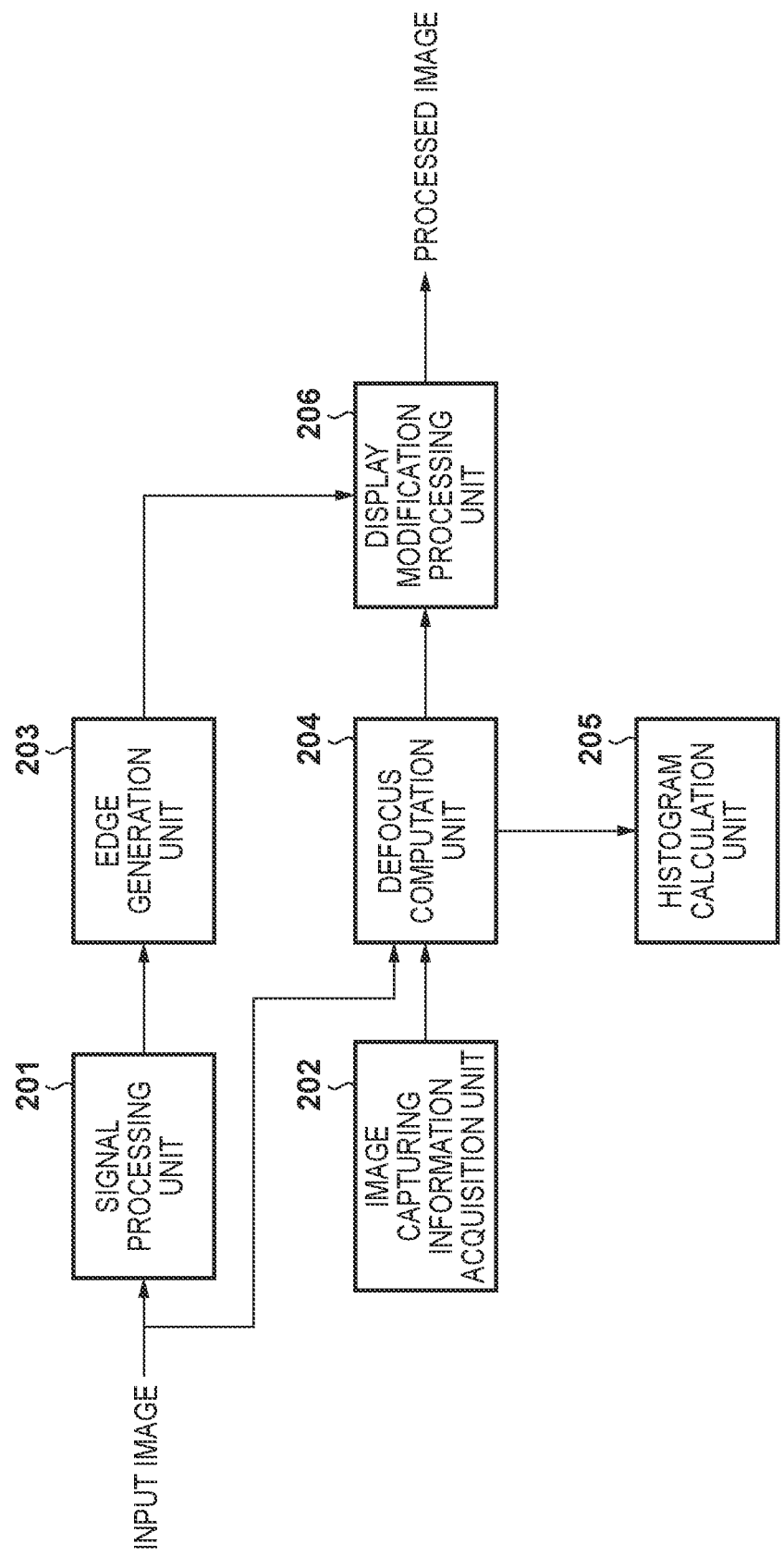

IMAGE PROCESSING APPARATUS, IMAGE PROCESSING METHOD, AND STORAGE MEDIUM

BACKGROUND OF THE INVENTION

Field of the Invention

The present invention relates to an image processing apparatus that performs processing to modify a captured image and display the modified image on a monitor.

Description of the Related Art

Conventionally, an electronic viewfinder (EVF) for which a liquid crystal display (LCD) or the like is employed is used with a digital camera in order to allow the user to check an object. Furthermore, there is a known technology for displaying, on the EVF, an image on which the current focus position is superimposed in order to allow the user to capture an image while checking whether an object is in focus, the depth of the image sensing field, and so on.

For example, Japanese Patent Laid-Open No. 2016-4163 discloses technology for superimposing information for specifying the focus position on an image, displaying the image on the EVF, and changing the display state of the information for specifying the focus position according to the relationship between the focus position and the position of the object. Allegedly, according to Japanese Patent Laid-Open No. 2016-4163, when a user specifies a position that is to be in focus, the user can intuitively and easily specify the position in the depth direction as well.

However, if the image capturing mode or the scene to be captured changes, the configuration disclosed in Japanese Patent Laid-Open No. 2016-4163 does not invariably display information that meets the user's intention in capturing an image. Also, the user needs to specify the focus position and the range of the depth of field on the screen, and it is difficult for the user to adjust them and capture an image while looking into the viewfinder.

SUMMARY OF THE INVENTION

The present invention has been made in view of the above-described problems, and provides an image processing apparatus that can reduce the load on the user when the user adjusts the focus position and the depth of field to capture an image.

According to a first aspect of the present invention, there is provided an image processing apparatus comprising: at least one processor or circuit configured to function as following units: a first calculation unit configured to calculate, for an input image, a first range that is within a depth of field from a focus position; a second calculation unit configured to calculate, for the input image, a second range that is within a depth of field from the focus position corresponding to an aperture value virtually changed by a predetermined amount from an aperture value employed to capture the input image; and a display control unit configured to display an area in the first range or the second range on display apparatus depending on an image capturing mode employed to capture the input image, such that the area in the first range or the second range is distinguishable from an area other than the area in the first range or the second range.

According to a second aspect of the present invention, there is provided an image processing apparatus comprising: at least one processor or circuit configured to function as following units: a first calculation unit configured to calculate, for an input image, a first range that is within a depth of field from a focus position; a second calculation unit configured to calculate, for the input image, a second range that is within a depth of field from the focus position corresponding to an aperture value virtually changed by a predetermined amount from an aperture value employed to capture the input image; and a display control unit configured to display an area in the first range or the second range on display apparatus depending on focus adjustment information employed to capture the input image, such that the area in the first range or the second range is distinguishable from an area other than the area in the first range or the second range.

According to a third aspect of the present invention, there is provided an image processing method comprising: calculating, for an input image, a first range that is within a depth of field from a focus position; calculating, for the input image, a second range that is within a depth of field from the focus position corresponding to an aperture value virtually changed by a predetermined amount from an aperture value employed to capture the input image; and displaying an area in the first range or the second range on display apparatus depending on an image capturing mode employed to capture the input image, such that the area in the first range or the second range is distinguishable from an area other than the area in the first range or the second range.

According to a fourth aspect of the present invention, there is provided an image processing method comprising: calculating, for an input image, a first range that is within a depth of field from a focus position; calculating, for the input image, a second range that is within a depth of field from the focus position corresponding to an aperture value virtually changed by a predetermined amount from an aperture value employed to capture the input image; and displaying an area in the first range or the second range on display apparatus depending on focus adjustment information employed to capture the input image, such that the area in the first range or the second range is distinguishable from an area other than the area in the first range or the second range.

Further features of the present invention will become apparent from the following description of exemplary embodiments with reference to the attached drawings.

BRIEF DESCRIPTION OF THE DRAWINGS

FIG. 3 is a block diagram showing an image processing unit according to the first embodiment.

DESCRIPTION OF THE EMBODIMENTS

The following describes embodiments of the present invention in detail with reference to the attached drawings.

First Embodiment

The present embodiment describes an example in which a user captures an image of a plurality of people near the user, using an image capturing apparatus such as a digital camera, while looking into the EVF and adjusting the focal range. In the present embodiment, it is envisaged that the user captures an image in a manual focus (MF) mode in which the user adjusts the focus by moving a focus adjustment ring of a lens unit. However, the technology described in the present embodiment is also applicable to other usage modes, such as a mode in which the user touches a portion of the screen of the electronic viewfinder (EVF) to specify the focus position, a mode in which an autofocus (AF) function is used to capture an image, and so on. Also, although the following describes an image capturing apparatus as an example of an image processing apparatus, the image processing apparatus according to the present invention is not limited to an image capturing apparatus, and may be a personal computer (PC) or the like.

Figure 1:
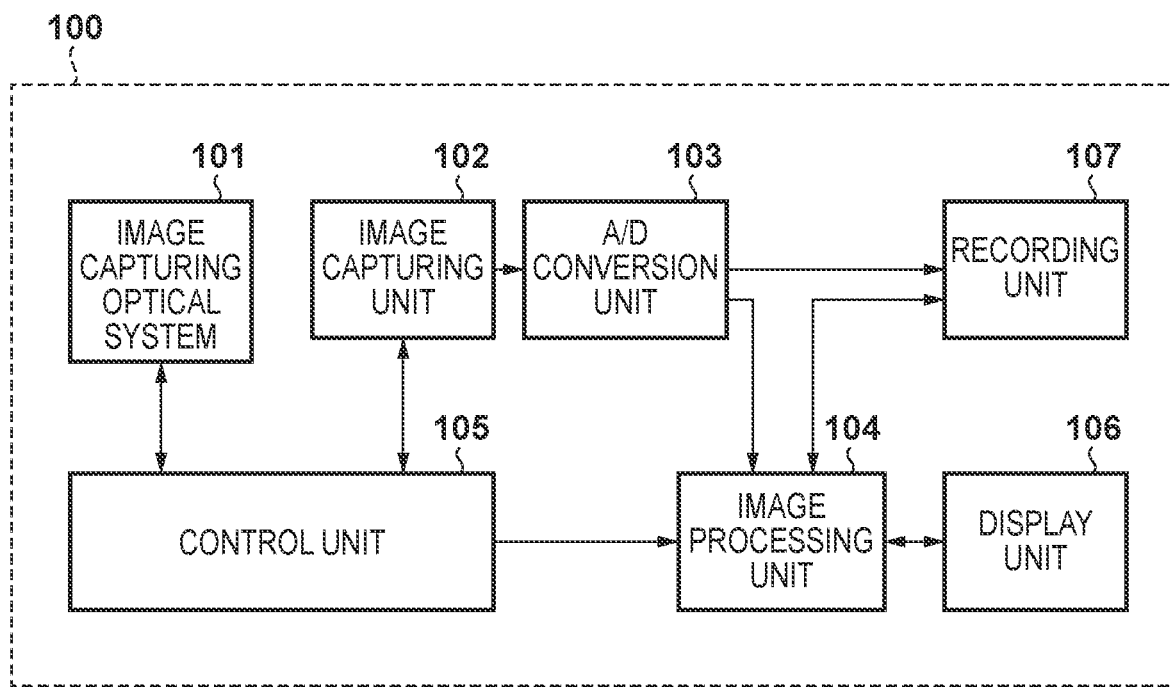
FIG. 1 is a block diagram showing a configuration of an image capturing apparatus that is a first embodiment of an image processing apparatus according to the present invention.

FIG. 1 is a block diagram showing a configuration of an image capturing apparatus 100 that is the first embodiment of the image processing apparatus according to the present invention. In FIG. 1, an image capturing optical system 101 includes a set of lenses including a zoom lens, a focus lens, and so on, an aperture adjustment device, and a shutter device. This image capturing optical system 101 adjusts the magnification of an object image that reaches an image capturing unit 102, the focus position, or the amount of light. The image capturing unit 102 includes an image sensor such as a CCD sensor or a CMOS sensor that performs photoelectric conversion on a light beam from an object, which has passed through the image capturing optical system 101, to convert the light beam to electrical signals.

An A/D conversion unit 103 converts input analog image signals to digital image signals. An image processing unit 104 performs processing to modify a display image according to the present embodiment in addition to performing typical signal processing. The image processing unit 104 can also perform similar image processing on images read out from a recording unit 110 in addition to images output from the A/D conversion unit 103.

A control unit 105 calculates an exposure value for image capturing in order to obtain an input image with appropriate brightness, and controls the image capturing optical system 101 and the image capturing unit 102 to control the aperture, the shutter speed, and the analog gain of the image sensor, in order to realize such an exposure value.

A display unit 106 sequentially displays images output from the image processing unit 104, on a display member such as a liquid crystal device (LCD), and thus functions as an electronic viewfinder (EVF). A recording unit 107 has the function of recording images, and may include an information recording medium that is formed using a memory card on which a semiconductor memory is mounted, a package that houses a rotating recording member such as a magneto-optical disk, or the like.

Figure 2A:
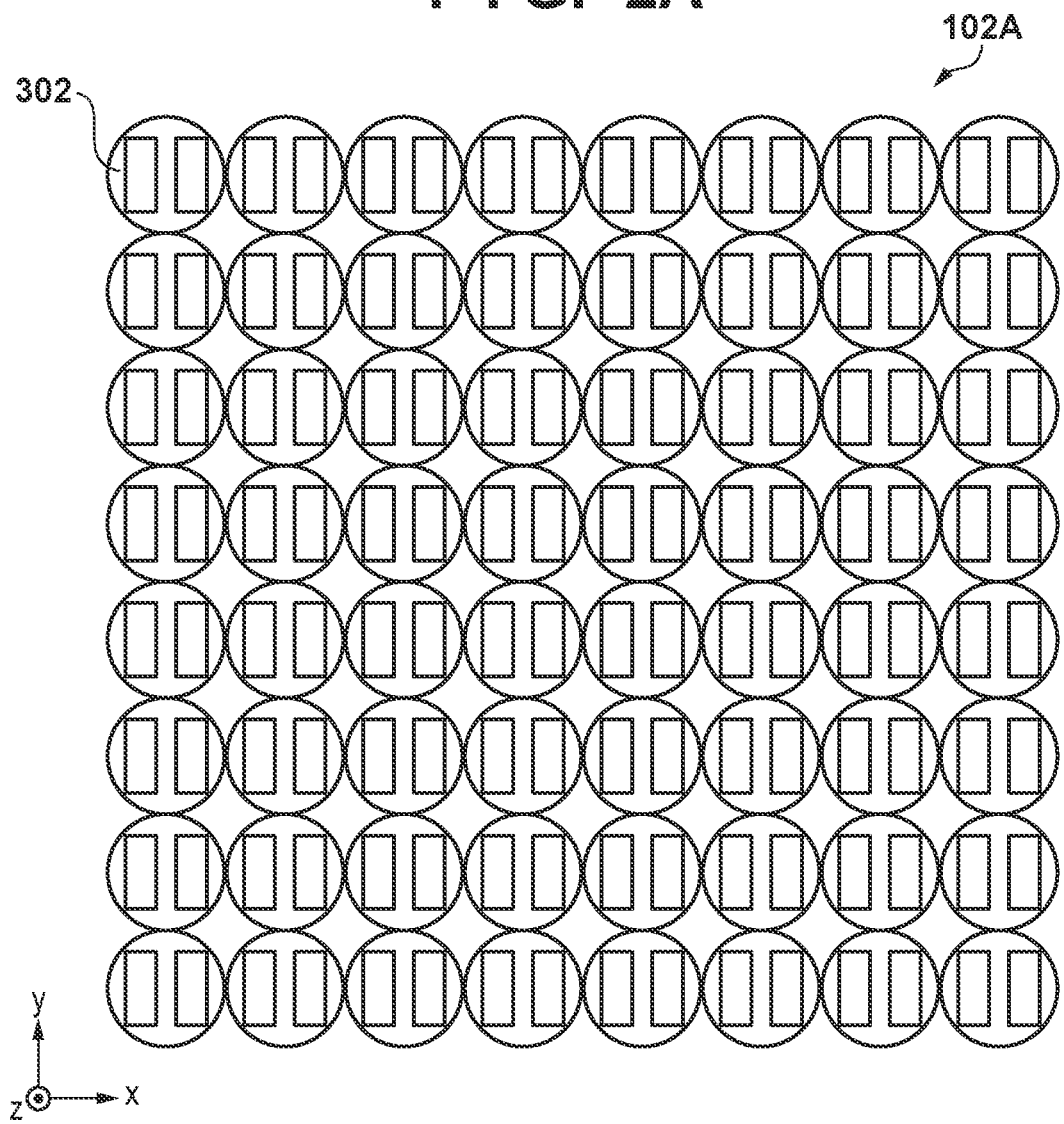
FIGS. 2A and 2B show a configuration of an image sensor according to the first embodiment.
Figure 2B:
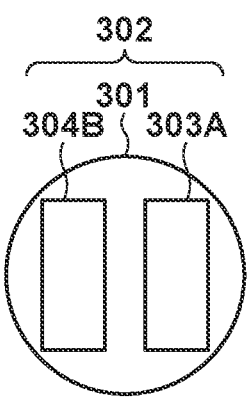

FIGS. 2A and 2B show an image sensor 102A included in the image capturing unit 102. FIG. 2A shows an arrangement of pixels of the image sensor 102A. FIG. 2B is an enlarged view of a unit pixel 302 of the image sensor 102A, and shows that each unit pixel 302 includes a microlens 301 and a pair of photoelectric conversion elements 303A and 304B. As shown in FIG. 2A, unit pixels 302 are two-dimensionally and regularly arranged on the image sensor 102A.

FIG. 3 is a block diagram showing an internal structure of the image processing unit 104. In FIG. 3, a signal processing unit 201 performs typical signal processing such as noise reduction processing and development processing, and also performs tone compression processing through gamma conversion or the like, to compress the tones of images into a predetermined output range. An image capturing information acquisition unit 202 acquires various kinds of information for image capturing, such as an image capturing mode, a focal distance, an aperture value, an exposure time, and so on that have been set by a user to capture an image.

An edge generation unit 203 performs processing to generate edge signals from an image output by the signal processing unit 201. A defocus computation unit 204 generates a defocus map that shows the distribution of defocusing values of a captured image, based on phase differences between a plurality of images of an object formed by light beams passing through different areas of the exit pupil of the image capturing optical system 101. A histogram calculation unit 205 generates a histogram for a defocus map generated by the defocus computation unit 204. A display modification processing unit 206 performs processing to modify an image processed by the signal processing unit 201, to display the image on the display unit 106, using outputs from the edge generation unit 203 and the defocus computation unit 204.

Figure 4:
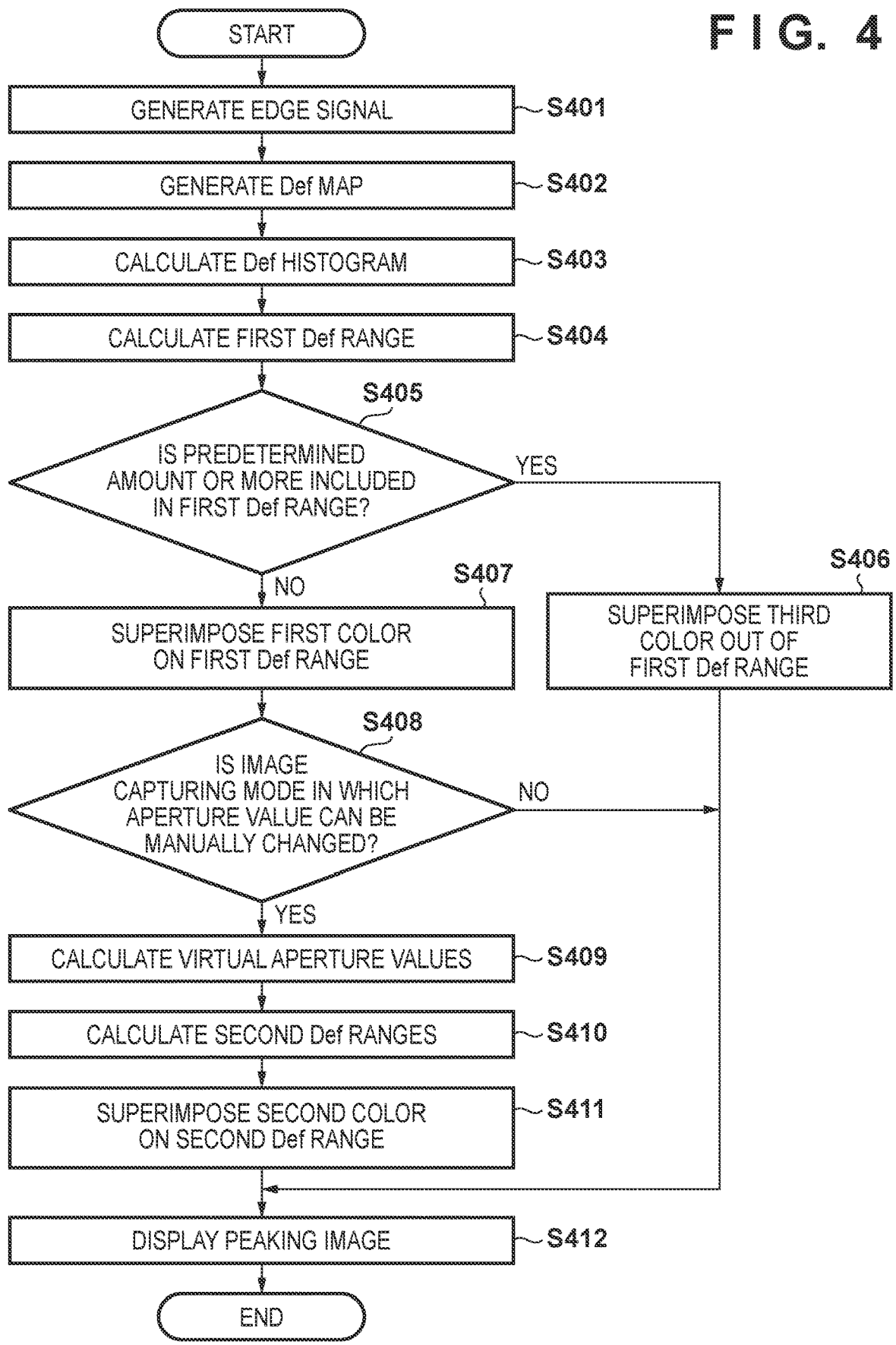
FIG. 4 is a flowchart showing operations of the image processing apparatus according to the first embodiment.
Figure 5:
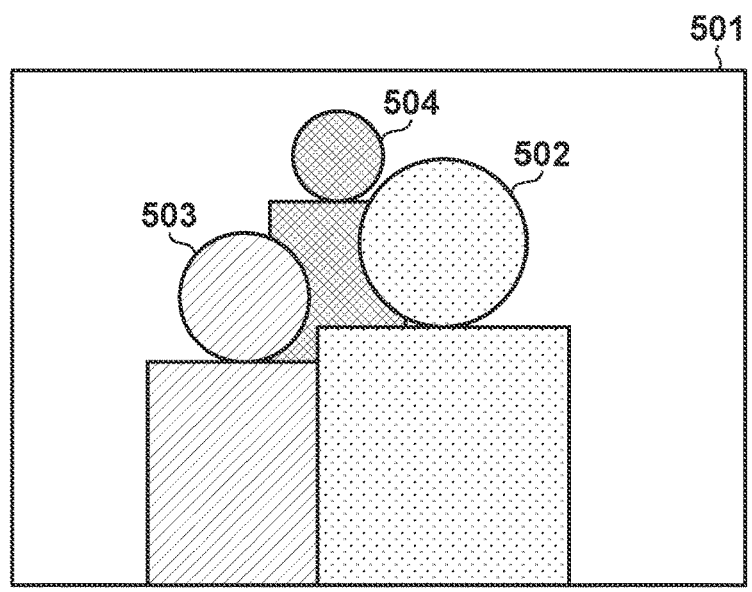
FIG. 5 shows an input image according to the first embodiment.

The following describes the details of display modification processing that is performed when the user adjusts the focal range to capture a still image while looking into the EVF, with reference to the flowchart shown in FIG. 4. An image 501 in FIG. 5 shows an example of an input image pertaining to the present processing, and shows a scene in which three persons 502, 503, and 504 are lined up from the near side to the far side in a view from the image capturing apparatus 100.

Figure 6A:
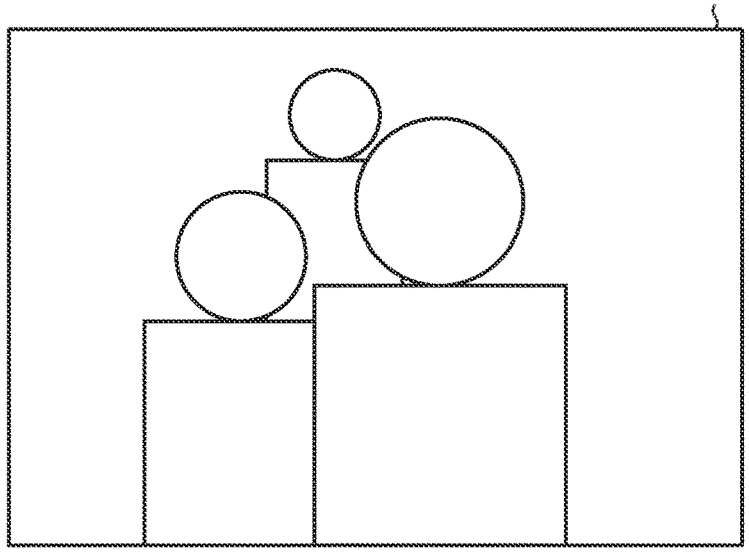
FIGS. 6A and 6B show an edge image and a defocus map according to the first embodiment.

In step S401, the edge generation unit 203 applies a Bpf (band-pass filter) to the input image 501 to generate an edge image. Specifically, the edge generation unit 203 adds, to the input image, signals obtained by applying a filter [−1 0 2 0 −1] to the input image in the horizontal direction and the vertical direction. Note that a method for generating an edge image is not limited to the above example, and may be another method such as a method through which edge components are extracted by calculating a difference between an image to which an Lpf (low-pass filter) has been applied and the original image. An image 601 in FIG. 6A is the resulting edge image.

Figure 6B:
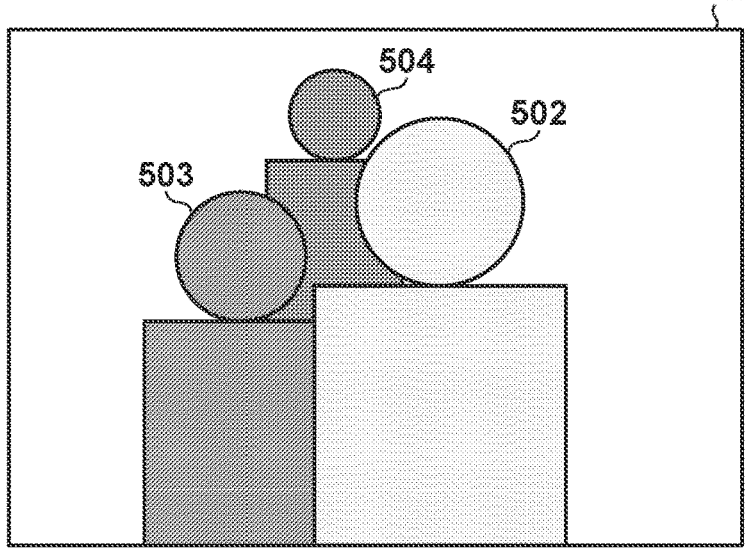

In step S402, the defocus computation unit 204 generates a defocus map for the input image 501. Specifically, a known method such as that described in Japanese Patent Laid-Open No. 2016-9062 is used to calculate a defocusing value for each pixel and generate a defocus map. An image 602 in FIG. 6B is the resulting defocus map. In the image 602, the area of a person 503 in the middle in the depth direction has a value that indicates an in-focus state, a person 502 on the near side indicates an out-of-focus state with a foreground blur, and a person 504 on the far side indicates an out-of-focus state with a background blur.

Figure 7:
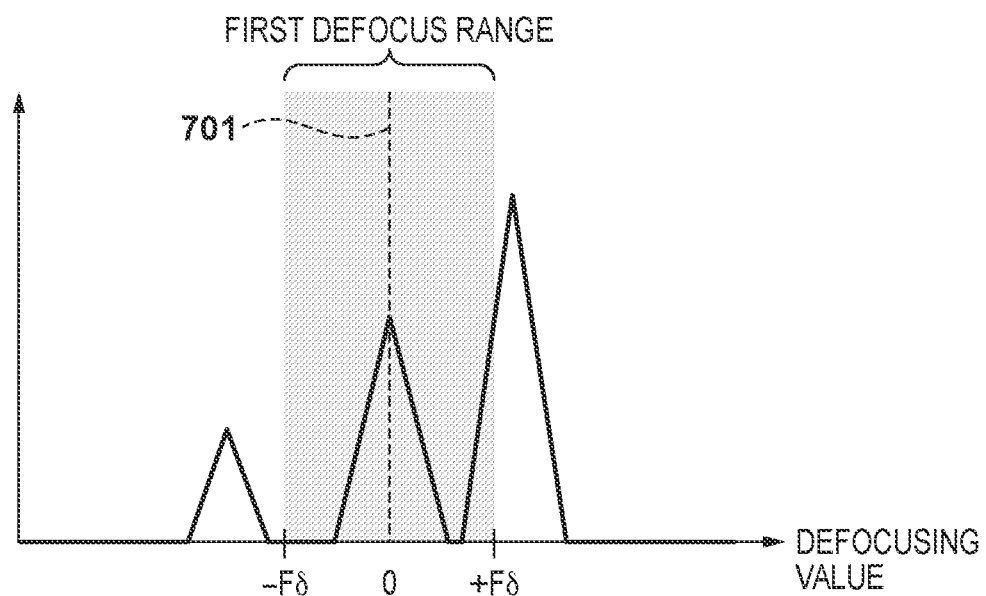
FIG. 7 shows a histogram for defocusing values and the range of the depth of field according to the first embodiment.

In step S403, the histogram calculation unit 205 generates a histogram for defocusing values based on the defocus map image 602 generated in step S402. FIG. 7 shows the resulting histogram. In this figure, a defocus value indicated by dotted lines 701 is 0, which means perfect focus.

In step S404, a first defocus range is calculated using the histogram for defocusing values generated in step S403. Here, the first defocus range is the range of defocusing values that are determined as being included within the depth of field of the image that is currently captured. To calculate the first defocus range, an aperture value obtained by the image capturing information acquisition unit 202 for the input image 501 is denoted as F, the value of the acceptable circle of confusion diameter, i.e. a value that depends on the number of pixels and the size of the image capturing unit 102, is denoted as δ, and the upper limit value and the lower limit value of the range are respectively denoted as +Fδ and −Fδ. Thus, as shown in the histogram in FIG. 7, the area in which defocusing values are within the range of −Fδ to +Fδ (the grey part) can be determined as being included within the depth.

In step S405, the proportion of the number of pixels included in the first defocus range calculated in step S404 is used as scene information to control the way in which processing is performed to modify the image in the subsequent stage. Specifically, if the proportion of the number of pixels included in the first defocus range to the total number of pixels in the defocus map image 602 is no less than 80% (no less than a predetermined proportion), processing proceeds to the modification processing that starts from step S406, or otherwise processing proceeds to the modification processing that starts from step S407. For example, if only one person, namely the person 503, is included in the depth in the defocus map image 602, and the aforementioned proportion is less than 80%, processing proceeds to step S407.

Figure 8:
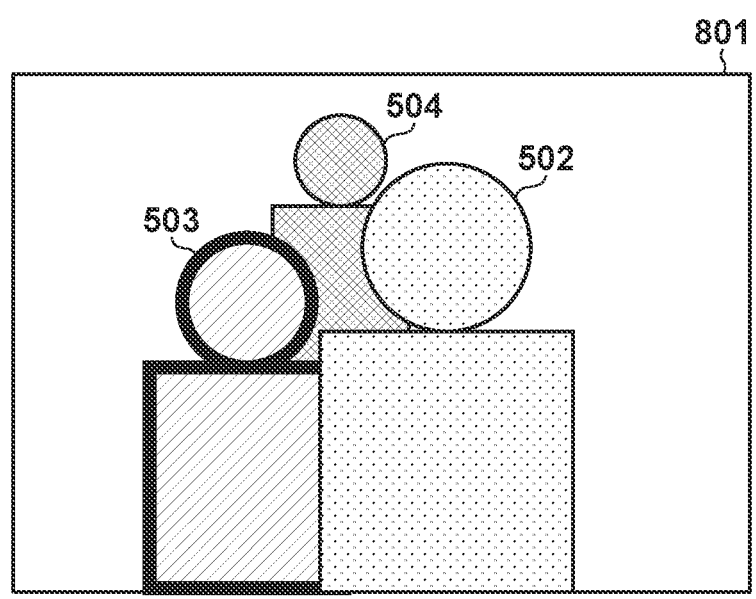
FIG. 8 shows a display image according to the first embodiment.

In step S407, the display modification processing unit 206 applies display modification processing to the input image 501. Specifically, the display modification processing unit 206 performs processing to superimpose green color signals on an area of the input image 501 for which the values of edge signals generated in step S401 are no less than a predetermined value and the defocusing values generated in step S402 are included in the first defocus range (i.e. performs processing to display such an area so as to be distinguishable). An image 801 in FIG. 8 is the resulting image. It can be seen that the color green (a thick line) is superimposed only on the edge area of the person 503 in the middle in the depth direction so as to be noticeable (display control). In contrast, the color green is not superimposed on the other two people, namely the person 502 and the person 504, and it can be seen that these two people are out of the depth (out of the first defocus range).

In step S408, the image capturing information acquisition unit 202 acquires information regarding the image capturing mode that has been set for image capturing. If the image capturing mode is a mode in which the aperture value can be manually changed by the user as appropriate such as an aperture priority mode or a manual mode, processing proceeds to step S409, and if the image capturing mode is another mode such as a shutter speed priority mode or an automatic mode (a mode other than an image capturing mode in which the aperture value is changeable), processing proceeds to step S412.

In step S409, the defocus computation unit 204 calculates two virtual aperture values. Here, virtual aperture values are aperture values that are different from the current aperture value (aperture values that have been changed by a predetermined amount), and can be calculated using the following equations.

$$FV+ = FR \times (\sqrt{2})^{N+} \qquad \text{(Equation 1)}$$

$$FV- = FR \times (\sqrt{2})^{N-} \qquad \text{(Equation 2)}$$

Here, FV+ and FV− denote virtual aperture values, FR denotes the current aperture value, and N+ and N− each denote the number of stops by which the aperture value is to be changed to increase or reduce the depth of field, both of which are constants that are determined according to FR. More specifically, in the present embodiment, the control unit 105 determines the number of stops by which the aperture is virtually widened or narrowed relative to the current aperture value, and how the depth of field will change if the aperture is widened or narrowed by the number of stops is calculated and displayed on the display unit 106. The user can check the number of stops by which the aperture value is changed and how the depth of field changes, and take them into consideration when determining the amount by which the aperture is to be changed, to obtain a desirable depth of field.

Figure 9A:
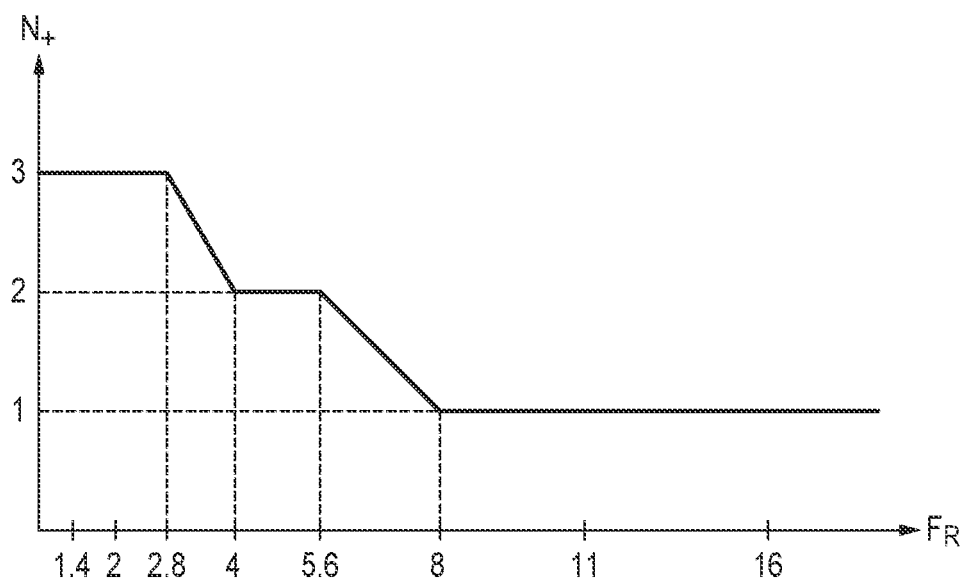
FIGS. 9A and 9B show a method for calculating the number of stops by which the aperture is changed according to the first embodiment.
Figure 9B:
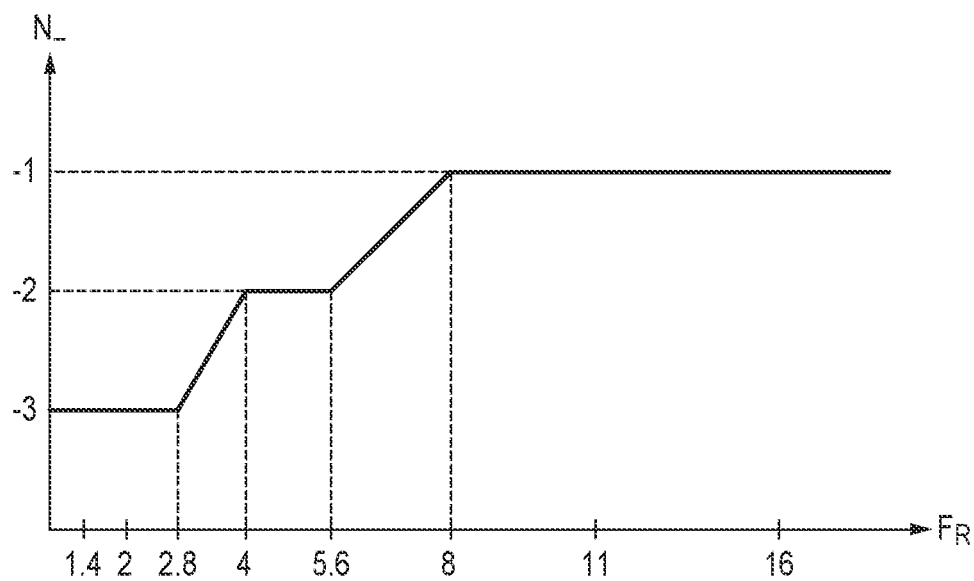

The number of stops N+ and the number of stops N− used to virtually widen or narrow the aperture are determined as follows. FIGS. 9A and 9B show the relationships between the current aperture value FR and the number of stops N+ and the number of stops N− used to virtually change the aperture value. It can be seen that the value of N+ decreases and the value of N− increases as the value of FR increases. This is because the amount of change in the depth is smaller for a smaller current aperture value FR (a wider aperture), and the aim is to increase the amount of change in the depth by increasing the extent to which the aperture value is virtually changed. In this way, by changing the amounts N+ and N− by which the aperture value is virtually changed, according to the current aperture value, the user can easily grasp how the depth of field will change upon the aperture value being changed.

Note that a method for calculating the virtual aperture values FV+ and FV− is not limited to the above-described method, and may be another method, such as a method through which N+ is increased as FR increases. It is also possible to allow the user to freely determine settings. For example, it is possible to employ a method through which the depth is displayed using FV+ increased by one stop as an aperture value, while the depth when the aperture is open is displayed, with FV− being fixed at the minimum aperture value.

Figure 10:
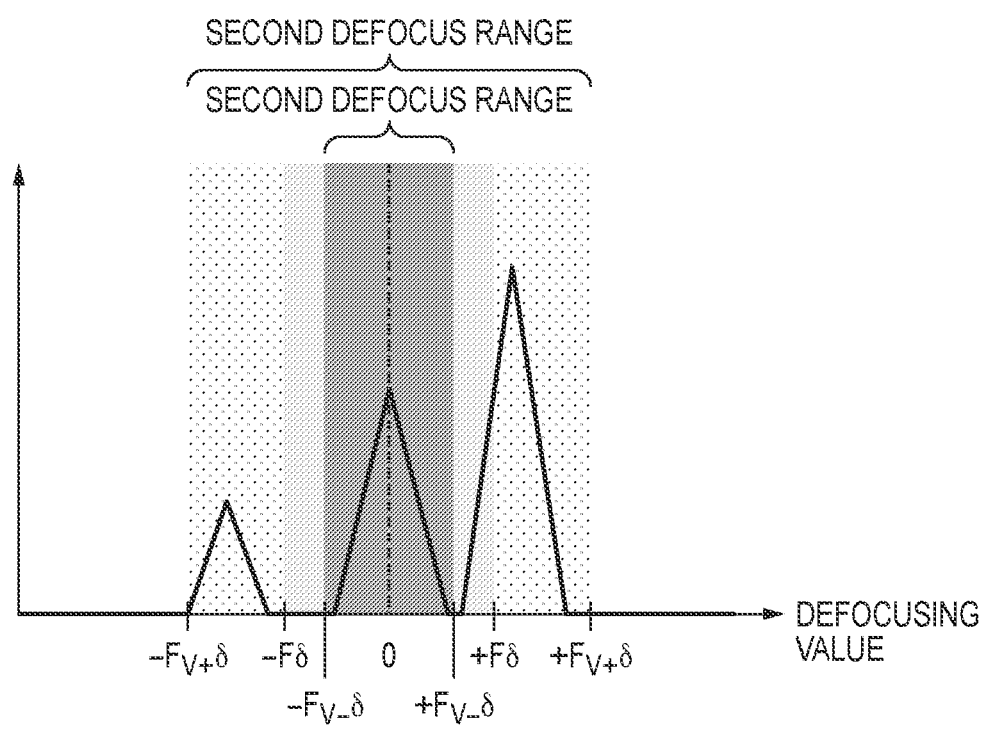
FIG. 10 shows second ranges of the depth of field according to the first embodiment.

In step S410, the defocus computation unit 204 calculates second defocus ranges for the virtual aperture values FV+ and FV− calculated in step S409. To calculate the second defocus ranges, as in step S404, the upper limit value and the lower limit value of the depth of field when the aperture value is changed to a larger value are respectively denoted as +FV+δ and −FV+δ, and the upper limit value and the lower limit value of the depth of field when the aperture value is changed to a smaller value are respectively denoted as +FV−δ and −FV−δ. Examples of the resulting second defocus ranges are shown in FIG. 10. In this figure, the two second defocus ranges are respectively narrower and wider than the first defocus range calculated in step S404, which respectively indicate that the depth is reduced or increased as a result of the aperture value being virtually changed.

In step S411, the display modification processing unit 206 furthermore performs modification processing on the image on which modification processing has been performed in step S407. Specifically, processing is performed to superimpose color signals for rendering a predetermined color on an area for which the defocusing values generated in step S402 are included in the second defocus ranges. In step S410 here, two second defocus ranges are calculated, one for the case where the aperture value is increased, and the other for the case where the aperture value is reduced. However, the color signals may be superimposed on an area that is within the depth and is included in one of the two ranges, or color signals for rendering different colors may be superimposed on areas corresponding to the two ranges, respectively. For example, the color blue is superimposed on an area that is within the depth when the aperture value is increased, and the color red is superimposed on an area that is within the depth when the aperture value is reduced. As a result, it is possible to show the extent to which the depth will change upon the aperture value being changed.

Figure 11:
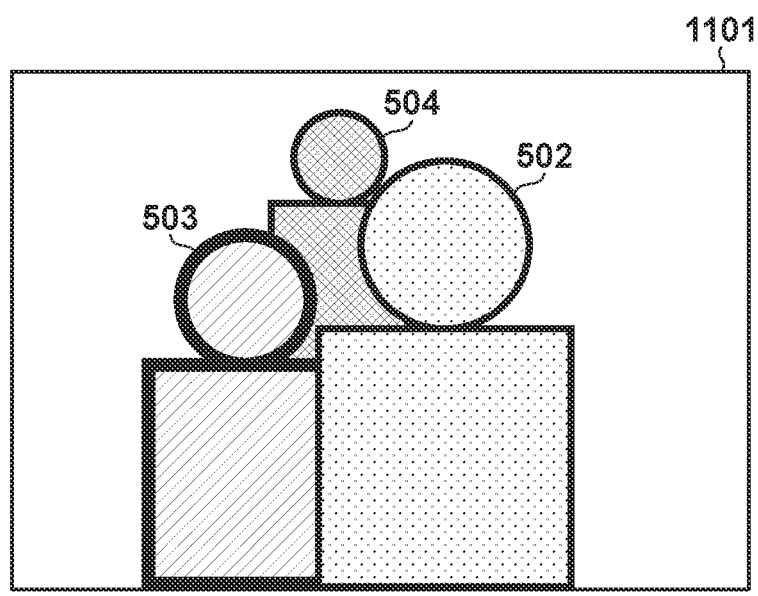
FIG. 11 shows a display image according to the first embodiment.

An image 1101 in FIG. 11 is the resulting image. In the image 801 in FIG. 8, color signals are superimposed only on the edge area of the person 503 in the middle in the depth direction, whereas, in FIG. 11, it can be seen that color signals are also superimposed (medium thick lines) on the edge area of the person 502 on the near side and the edge area of the person 504 on the far side. Therefore, the user can determine how much the aperture value should be adjusted in order to put all of the three people within the depth.

In step S412, the modified image 1101 generated by the display modification processing unit 206 is displayed on the display unit 106.

On the other hand, in step S405, if the proportion of the number of pixels included in the first defocus range to the total number of pixels of the defocus map image is greater than or equal to 80%, processing proceeds to step S406. An example of an image capturing situation that satisfies this condition is a situation in which an image of a distant view in an outdoor scene is captured.

Figure 12:
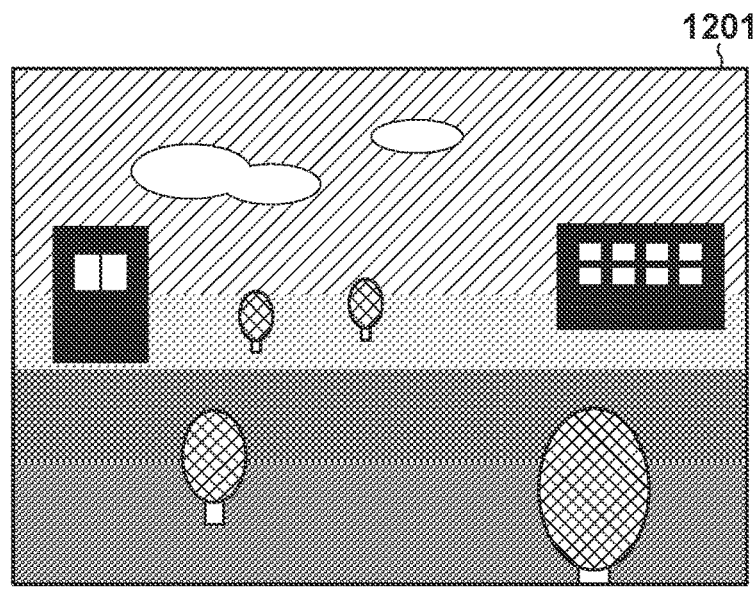
FIG. 12 shows another example of an input image according to the first embodiment.
Figure 13A:
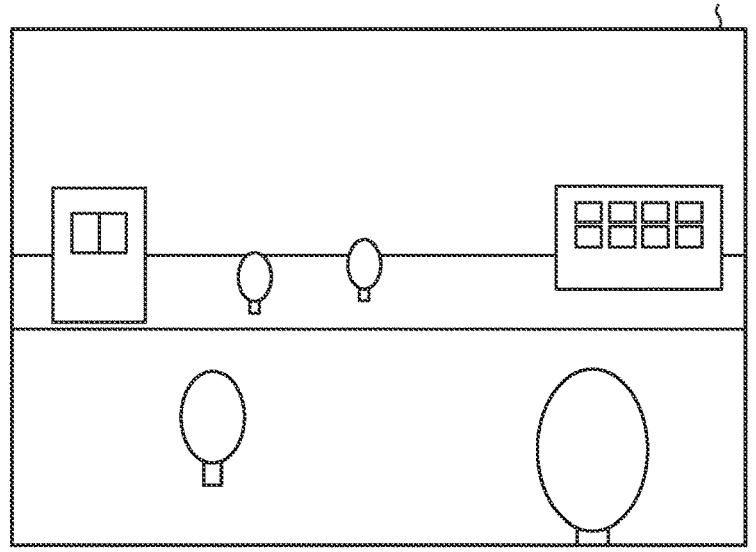
FIGS. 13A and 13B show an edge image and a defocus map according to the first embodiment.
Figure 13B:
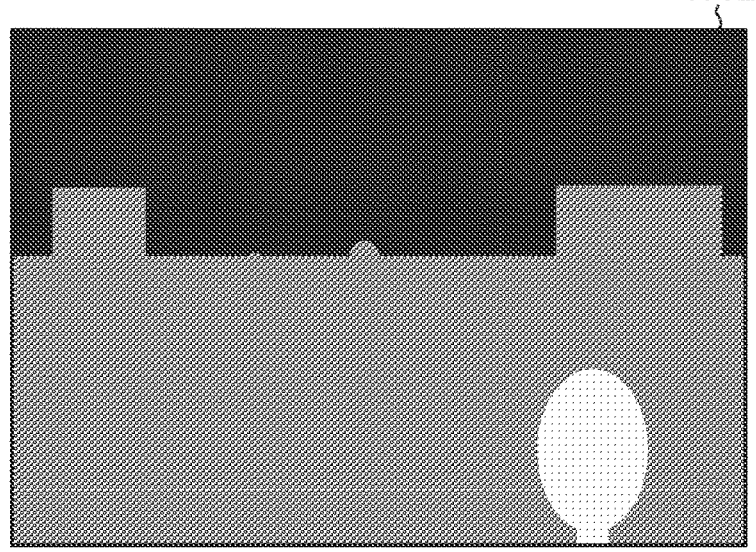
Figure 14:
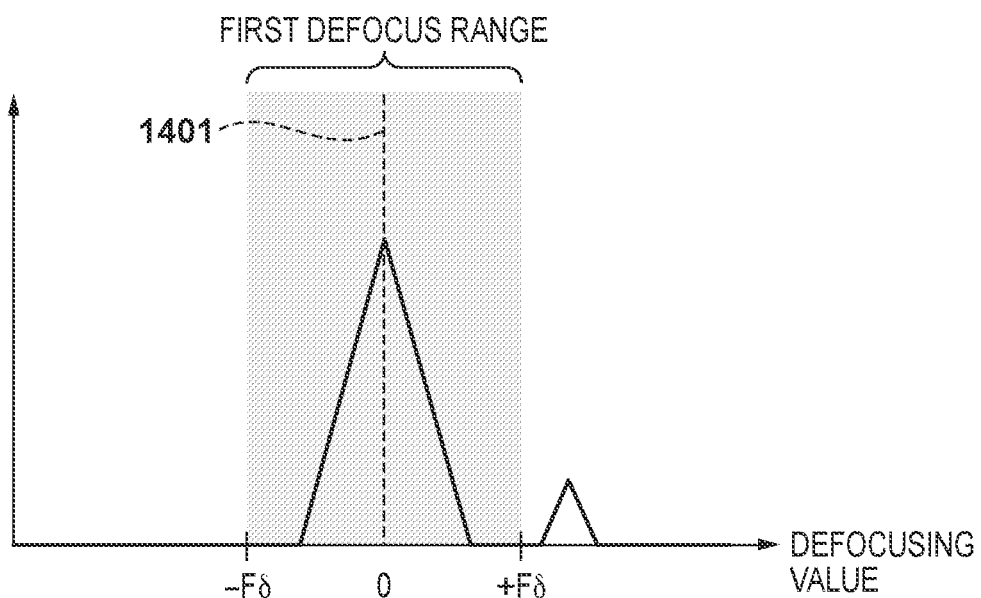
FIG. 14 shows a histogram for defocusing values and the range of the depth of field according to the first embodiment.

An image 1201 in FIG. 12 is an example of an input image, and shows a scene in which plants, a river, buildings, and so on are present in the distance. An image 1301 in FIG. 13A is an edge image that can be obtained in step S401 when the image 1201 is an input image. An image 1302 in FIG. 13B is a defocus map that can be obtained in step S402 when the image 1201 is an input image. FIG. 14 is a histogram that can be obtained in step S403 when the image 1201 is an input image.

When the input image is the image 1201, the first defocus range calculated by the defocus computation unit 204 in step S404 is a grey part 1401 in the histogram shown in FIG. 14. As can be seen from this figure, the first defocus range is wider than that in the histogram shown in FIG. 7 in the case where the input image is the image 501. This is because the focus in the distant view shown in the input image 1201 is set at a distance and a deep focus state is achieved, i.e. the depth is large. As a result, at the determination in step S405, the proportion of the number of pixels included in the first defocus range to the total number of pixels of the defocus map image 1302 is no less than 80%, and processing proceeds to step S406.

Figure 15:
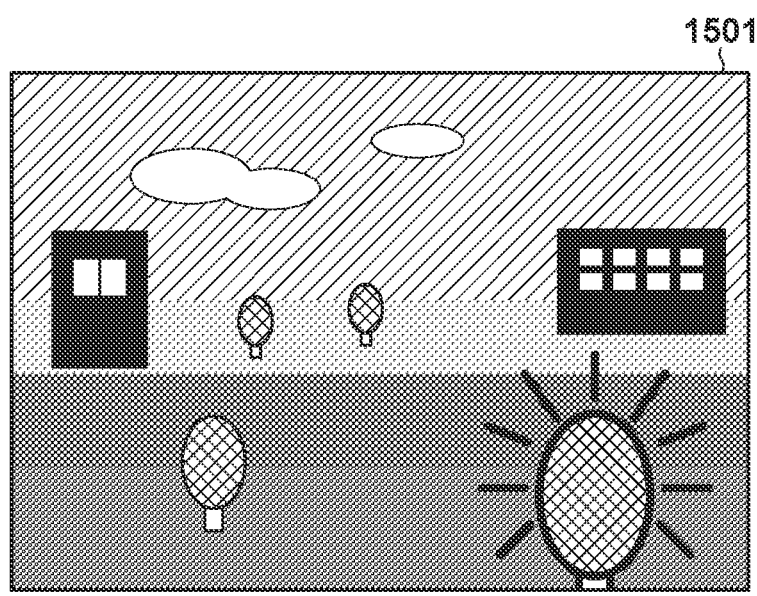
FIG. 15 shows another example of a display image according to the first embodiment.

In step S406, the display modification processing unit 206 applies display modification processing to the input image 1201, and in step S412, the modified image generated by the display modification processing unit 206 is displayed on the display unit 106. Specifically, the display modification processing unit 206 performs processing to superimpose yellow color signals on an area of the input image 501 in which the values of edge signals generated in step S401 are no less than a predetermined value and the defocusing values generated in step S402 are not included in the first defocus range. Furthermore, processing is performed to blink the modified portion when the image is displayed on the display unit 106. If processing is performed to superimpose color signals on an area for which the defocusing values are included in the first defocus range as in step S407, the color signals will be superimposed on a large portion of the image 1201, and the visibility of an area that is out of the depth of field degrades. The aforementioned processing is performed in order to avoid such degradation. An image 1501 shown in FIG. 15 is an image that is actually displayed, and it can be seen that the nearest plant (which is the closest to the image capturing apparatus) is noticeable (a thick line). As a result, the user can discern that areas that do not blink are within the depth of field, and some areas that blink are out of the depth of field.

As described above, processing according to the present embodiment, thorough which an input image is acquired, defocus computation and modification processing are performed by the image processing unit 104, and the resulting image is displayed on the display unit 106, is executed. With such a configuration according to the present embodiment, information regarding the depth of field is displayed using a method that is suitable for the way in which the user captures an image and for the scene that is captured by the user. As a result, it is possible to reduce the load on the user when the user adjusts the focus position and the depth to capture an image.

Although modification processing according to the present embodiment is performed such that a range within the depth corresponding to one aperture value is represented with one color, the present invention is not limited in this way, and modification processing may be performed with different colors, using a value indicating an in-focus state (the defocusing value is 0) as a threshold value. For example, an area in which the defocusing value is larger than 0 (the near side) in the second defocus range calculated in step S410 is shown in light blue, and an area in which the defocusing value is smaller than 0 (the far side) is shown in deep blue. Thus, it is possible to make it easier for the user to discern the positional relationship between the objects in the front-back direction, and determine which side the focus position is to be moved to. In particular, convenience is further improved in a case where two objects have similar defocusing values, but are away from each other in an in-plane direction in the image, and the positional relationship in the front-back direction cannot be easily determined by only visually observing the objects. Also, a modification method is not limited to the method through which color signals are simply superimposed, and may be another method, such as a method through which brightness and colorfulness are changed according to the defocusing value.

Also, although the present embodiment describes an example in which information regarding a distance to an object is acquired based on a phase difference between a plurality of object images formed by light beams passing through different areas of the exit pupil of the image capturing optical system as shown in FIGS. 2A and 2B, another configuration or means may be used instead of, or together with, the above-described one. For example, a multi-lens camera that has a plurality of lenses and a plurality of image sensors may be used to make it possible to more accurately detect an image shift amount. Also, by employing a configuration that can measure a distance using a TOF (Time Of Flight) camera or an ultrasonic wave, it is possible to improve performance in measuring a distance to an object that has a monotonous pattern.

Second Embodiment

The following describes a second embodiment of the present invention. The configuration of an image processing apparatus according to the second embodiment is the same as the configuration of that according to the first embodiment. Therefore, a description thereof is omitted. The image processing apparatus according to the present embodiment is different from the first embodiment in operations. The following describes operations that are different from those in the first embodiment, with reference to the flowchart shown in FIG. 16 as well as FIGS. 5 to 11.

Figure 16:
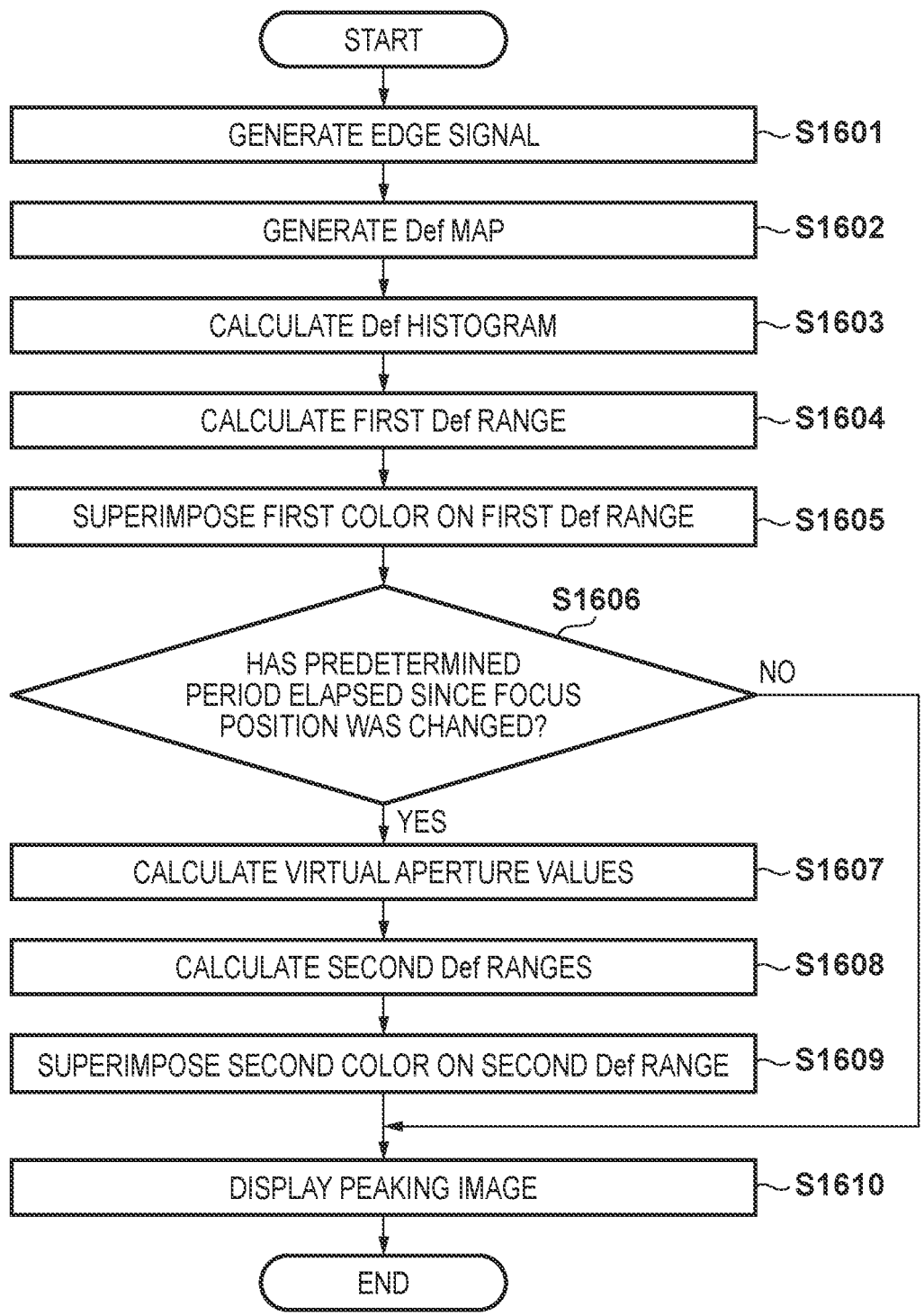
FIG. 16 is a flowchart showing operations of an image processing apparatus according to a second embodiment.

FIG. 16 is a flowchart showing operations of the image processing apparatus according to the second embodiment. First, in step S1601, the edge generation unit 203 applies a Bpf (band-pass filter) to the input image 501 shown in FIG. 5 to generate an edge image. Specifically, the edge generation unit 203 adds, to the input image, signals obtained by applying a filter [−1 0 2 0 −1] to the input image in the horizontal direction and the vertical direction. Note that a method for generating an edge image is not limited to the above example, and may be another method such as a method through which edge components are extracted by calculating a difference between an image to which an Lpf (low-pass filter) has been applied and the original image. The image 601 in FIG. 6A is the resulting edge image.

In step S1602, the defocus computation unit 204 generates a defocus map for the input image 501. A specific generation method is the same as that in the first embodiment. The image 602 in FIG. 6B is the resulting defocus map. In the image 602, the area of a person 503 in the middle in the depth direction has a value that indicates an in-focus state, a person 502 on the near side indicates an out-of-focus state with a foreground blur, and a person 504 on the far side indicates an out-of-focus state with a background blur.

In step S1603, the histogram calculation unit 205 generates a histogram for defocusing values based on the defocus map image 602 generated in step S1602. FIG. 7 shows the resulting histogram. In this figure, a defocus value indicated by dotted lines 701 is 0, which means perfect focus. Also, a positive defocusing value means an out-of-focus state with a foreground blur, and a negative defocusing value means an out-of-focus state with a background blur.

In step S1604, the first defocus range is calculated using the histogram for defocusing values generated in step S1603. Here, the first defocus range is the range of defocusing values that are determined as being included within the depth of field of the image that is currently captured. To calculate the first defocus range, an aperture value obtained by the image capturing information acquisition unit 202 for the input image 501 is denoted as F, the value of the acceptable circle of confusion diameter, i.e. a value that depends on the number of pixels and the size of the image capturing unit 102, is denoted as δ, and the upper limit value and the lower limit value of the range are respectively denoted as +Fδ and −Fδ. Thus, as shown in the histogram in FIG. 7, the area in which defocusing values are within the range of −Fδ to +Fδ (the grey part) can be determined as being included within the depth.

In step S1605, the display modification processing unit 206 applies display modification processing to the input image 501. Specifically, the display modification processing unit 206 performs processing to superimpose green signals on an area of the input image 501 for which the values of edge signals generated in step S1601 are no less than a predetermined value and the defocusing values generated in step S1602 are included in the first defocus range. The image 801 in FIG. 8 is the resulting image. It can be seen that the color green (a thick line) is superimposed only on the edge area of the person 503 in the middle in the depth direction so as to be noticeable. In contrast, the color green is not superimposed on the other two people, namely the person 502 and the person 504, and it can be seen that these two people are out of the depth.

In step S1606, the control unit 105 determines whether or not a predetermined period of time has elapsed from when the user changed the focus position of the image capturing optical system 101 (focus adjustment information). Specifically, first, the control unit 105 determines whether or not focus adjustment has been performed, at predetermined time intervals, and determines that the focus position has been changed if the user has moved the focus adjustment ring. Next, the control unit 105 determines whether or not a predetermined period of time, e.g. a period of three seconds, has elapsed from when the focus position was changed. Here, the predetermined period of time is provided from when the focus position was changed because the user, when adjusting the focus in the manual focus (hereinafter "MF") mode, slightly moves or stops the adjustment ring, and it is desirable to prevent the result of determination from responsively changing. Note that the method for adjusting the focus is not limited to the above method, and even when the AF mode is active, the user can adjust the focus by operating an operation member other than the focus adjustment ring, such as the shutter button or the screen of the display unit 106. Also, the method for detecting focus adjustment may be another method such as a method through which determination is performed based on changes in edge signals that are within the depth of the input image 501. If it is determined that the predetermined period of time has elapsed from when the focus position was changed, processing proceeds to step S1607, or otherwise processing proceeds to step S1610.

In step S1607, the defocus computation unit 204 calculates two virtual aperture values. Here, virtual aperture values are aperture values that are different from the current aperture value, and can be calculated using the following equations.

$$FV+=FR\times(\sqrt{2})^{N+} \quad \text{(Equation 1)}$$

$$FV-=FR\times(\sqrt{2})^{N-} \quad \text{(Equation 2)}$$

Here, FV+ and FV− denote virtual aperture values, FR denotes the current aperture value, and N+ and N− each denote the number of stops by which the aperture value is to be changed to increase or reduce the depth of field, both of which are constants that are determined according to FR. More specifically, in the present embodiment, the control unit 105 determines the number of stops by which the aperture is virtually widened or narrowed relative to the current aperture value, and how the depth of field will change if the aperture is widened or narrowed by the number of stops is calculated and displayed on the display unit 106. The user can check how the depth of field changes, and take it into consideration when determining the amount by which the aperture is to be changed, to obtain a desirable depth of field.

The number of stops N+ and the number of stops N− used to virtually widen or narrow the aperture are determined as follows. FIGS. 9A and 9B show the relationships between the current aperture value FR and the number of stops N+ and the number of stops N− used to virtually change the aperture value. It can be seen that the value of N+ decreases and the value of N− increases as the value of FR increases. This is because the amount of change in the depth is smaller for a smaller current aperture value FR (a wider aperture), and the aim is to increase the amount of change in the depth by increasing the extent to which the aperture value is virtually changed. In this way, by changing the amounts by which the aperture value is virtually changed, according to the current aperture value, the user can easily grasp how the depth of field will change upon the aperture value being changed.

Note that a method for calculating the virtual aperture values FV+ and FV− is not limited to the above-described method, and may be another method, such as a method through which N+ is increased as FR increases. It is also possible to allow the user to freely determine settings. For example, it is possible to employ a method through which the depth is displayed using FV+ increased by one stop as an aperture value, while the depth when the aperture is open is displayed, with FV− being fixed at the minimum aperture value.

In step S1608, the defocus computation unit 204 calculates second defocus ranges for the virtual aperture values FV+ and FV− calculated in step S1607. To calculate the second defocus ranges, as in step S1604, the upper limit value and the lower limit value of the depth of field when the aperture value is changed to a larger value are respectively denoted as +FV+δ and −FV+δ, and the upper limit value and the lower limit value of the depth of field when the aperture value is changed to a smaller value are respectively denoted as +FV−δ and −FV−δ. Examples of the resulting second defocus ranges are shown in FIG. 10. In the figure, the two second defocus ranges are respectively narrower and wider than the first defocus range calculated in step S1604, which respectively indicate that the depth is reduced or increased as a result of the aperture value being virtually changed.

In step S1609, the display modification processing unit 206 furthermore performs modification processing on the image on which modification processing has been performed in step S1605. Specifically, processing is performed to superimpose color signals for rendering a predetermined color on an area for which the defocusing values generated in step S1602 are included in the second defocus ranges. In step S1608 here, two second defocus ranges are calculated, one for the case where the aperture value is increased, and the other for the case where the aperture value is reduced. However, the color signals may be superimposed on an area that is within the depth and is included in one of the two ranges, or color signals for rendering different colors may be superimposed on areas corresponding to the two ranges, respectively. For example, the color blue is superimposed on an area that is within the depth when the aperture value is increased, and the color red is superimposed on an area that is within the depth when the aperture value is reduced. As a result, it is possible to show the extent to which the depth will change upon the aperture value being changed.

The image 1101 in FIG. 11 is the resulting image. In the image 801 in FIG. 8, color signals are superimposed only on the edge area of the person 503 in the middle in the depth direction, whereas, in FIG. 11, it can be seen that color signals are also superimposed (medium thick lines) on the edge area of the person 502 on the near side and the edge area of the person 504 on the far side. Therefore, the user can determine how much the aperture value should be adjusted in order to put all of the three people within the depth.

In step S1610, the modified image 1101 generated by the display modification processing unit 206 is displayed on the display unit 106. Color signals are superimposed on the area within the current depth range when the user adjusts the focus position, and color signals are superimposed on the areas within the depth ranges corresponding to a plurality of aperture values when the user adjust the depth range or the degree of blur. Thus, it is possible to display information that is suitable for the purpose for which the user performs an operation.

As described above, processing according to the present embodiment, thorough which an input image is acquired, defocus computation and modification processing are performed by the image processing unit 104, and the resulting image is displayed on the display unit 106, is executed. With such a configuration according to the present embodiment, when the user captures an image, information regarding the depth of field that is suitable for the state of a user operation is displayed. Thus, it is possible to reduce the load on the user when the user adjusts the focus position and the depth of field to capture an image.

Although modification processing according to the present embodiment is performed such that a range within the depth corresponding to one aperture value is represented with one color, the present invention is not limited in this way, and modification processing may be performed with different colors, using a value indicating an in-focus state (the defocusing value is 0) as a threshold value. For example, an area in which the defocusing value is larger than 0 (the near side) in the second defocus range calculated in step S1608 is shown in light blue, and an area in which the defocusing value is smaller than 0 (the far side) is shown in deep blue. Thus, it is possible to make it easier for the user to discern the positional relationship between the objects in the front-back direction, and determine which side the focal position is to be moved to. In particular, convenience is further improved in a case where two objects have similar defocusing values, but are away from each other in an in-plane direction in the image, and the positional relationship in the front-back direction cannot be easily determined by only visually observing the objects. Also, a modification method is not limited to the method through which color signals are simply superimposed, and may be another method, such as a method through which brightness and colorfulness are changed according to the defocusing value.

Also, although the present embodiment describes an example in which information regarding a distance is acquired based on a phase difference between a plurality of object images formed by light beams passing through different areas of the exit pupil of the image capturing optical system as shown in FIGS. 2A and 2B, another configuration or means may be used instead of, or together with, the above-described one. For example, a multi-lens camera that has a plurality of lenses and a plurality of image sensors may be used to make it possible to more accurately detect an image shift amount. Also, by employing a configuration that can measure a distance using a TOF (Time Of Flight) camera or an ultrasonic wave, it is possible to improve performance in measuring a distance to an object that has a monotonous pattern. Also, although a map of defocusing values is generated based on a phase difference between a plurality of object images formed by light beams passing through different areas of the exit pupil of the image capturing optical system in the present embodiment, the present invention is not limited in this way, and a map of image shift amounts calculated first based on the phase difference may be generated and used to perform display processing. In the case of a map of image shift amounts, the calculation load can be reduced and the processing speed can be increased when performing conversion to defocusing values. However, it is necessary to convert the range of the depth of field to the range of image shift amounts, and specify an area in an image that is within the depth of field. Defocusing values may further be converted to object distances from the image capturing apparatus to objects, and a map of object distances may be generated.

Although preferred embodiments of the present invention are described above, the present invention is not limited to the embodiments, and various modifications and changes may be made within the scope of the spirit of the present invention. For example, part or all of each of various kinds of image processing described in the above embodiments may be executed by an external device (e.g. a computer) of a device used for image capturing (e.g. camera).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-103670, filed May 30, 2018, which is hereby incorporated by reference herein in its entirety.

What is claimed is:

1. An image processing apparatus comprising:
at least one processor or circuit configured to function as following units:
a first calculation unit configured to calculate, for an input image, a first range that is within a depth of field from a focus position;
a second calculation unit configured to calculate, for the input image, a second range that is within a depth of field from the focus position corresponding to an aperture value virtually changed by a predetermined amount from an aperture value employed to capture the input image; and
a display control unit configured to display an area in the first range or the second range on display apparatus depending on an image capturing mode employed to capture the input image, such that the area in the first range or the second range is distinguishable from an area other than the area in the first range or the second range,
wherein, in a case where the image capturing mode is an image capturing mode other than an image capturing mode in which the aperture value is manually changeable, the display control unit displays an area in the first range on the display apparatus such that the area in the first range is distinguishable from an area other than the area in the first range.

2. The image processing apparatus according to claim 1, wherein, in a case where the image capturing mode is an image capturing mode in which the aperture value is manually changeable, the display control unit displays an area in the second range on the display apparatus such that the area in the second range is distinguishable from an area other than the area in the second range.

3. The image processing apparatus according to claim 1, wherein the second calculation unit sets the predetermined amount by which the aperture value is to be virtually changed, according to the aperture value employed to capture the input image.

4. The image processing apparatus according to claim 3, wherein the second calculation unit sets the predetermined amount by which the aperture value is to be virtually changed, such that the smaller the aperture value employed to capture the input image is, the larger the predetermined amount is.

5. The image processing apparatus according to claim 1, wherein the first and the second calculation units calculate whether or not a range is within a depth of field from a focus position, based on signals acquired from an image sensor that has a plurality of photoelectric conversion elements in one unit pixel.

6. The image processing apparatus according to claim 1, wherein the first and the second calculation units calculate whether or not a range is within a depth of field by detecting an object distance using light or an ultrasonic wave.

7. The image processing apparatus according to claim 1, wherein the display control unit displays an area in the first range or the second range on the display apparatus based on edge signals of the input image such that the area in the first range or the second range is distinguishable from an area other than the area in the first range or the second range.

8. An image processing apparatus comprising:
at least one processor or circuit configured to function as following units:

a first calculation unit configured to calculate, for an input image, a first range that is within a depth of field from a focus position;

a second calculation unit configured to calculate, for the input image, a second range that is within a depth of field from the focus position corresponding to an aperture value virtually changed by a predetermined amount from an aperture value employed to capture the input image; and a display control unit configured to display an area in the first range or the second range on display apparatus depending on an image capturing mode employed to capture the input image, such that the area in the first range or the second range is distinguishable from an area other than the area in the first range or the second range, wherein the display control unit superimposes a color on the area in the first range or the second range and displays the area on the display apparatus such that the area in the first range or the second range is distinguishable from an area other than the area in the first range or the second range in a case where the proportion of the number of pixels included in the first range or the second range to the total number of pixels of the input image is less than a predetermined proportion.

9. An image processing apparatus comprising:

at least one processor or circuit configured to function as following units:

a first calculation unit configured to calculate, for an input image, a first range that is within a depth of field from a focus position;

a second calculation unit configured to calculate, for the input image, a second range that is within a depth of field from the focus position corresponding to an aperture value virtually changed by a predetermined amount from an aperture value employed to capture the input image; and a display control unit configured to display an area in the first range or the second range on display apparatus depending on an image capturing mode employed to capture the input image, such that the area in the first range or the second range is distinguishable from an area other than the area in the first range or the second range, wherein the display control unit superimposes a color on an area other than the area in the first range or the second range and displays the area on the display apparatus such that the area in the first range or the second range is distinguishable from the area other than the area in the first range or the second range in a case where the proportion of the number of pixels included in the first range or the second range to the total number of pixels of the input image is no less than a predetermined proportion.

10. An image processing apparatus comprising:

at least one processor or circuit configured to function as following units:

a first calculation unit configured to calculate, for an input image, a first range that is within a depth of field from a focus position;

a second calculation unit configured to calculate, for the input image, a second range that is within a depth of field from the focus position corresponding to an aperture value virtually changed by a predetermined amount from an aperture value employed to capture the input image; and a display control unit configured to display an area in the first range or the second range on display apparatus depending on focus adjustment information employed to capture the input image, such that the area in the first range or the second range is distinguishable from an area other than the area in the first range or the second range, wherein, upon a predetermined period of time elapsing from when the focus position has been changed, the display control unit displays an area in the second range on the display apparatus such that the area in the second range is distinguishable from an area other than the area in the second range.

11. The image processing apparatus according to claim 10, wherein, in a case where a predetermined period of time has not elapsed from when the focus position has been changed, the display control unit displays an area in the first range on the display apparatus such that the area in the first range is distinguishable from an area other than the area in the first range.

12. The image processing apparatus according to claim 10, wherein the second calculation unit sets the predetermined amount by which the aperture value is to be virtually changed, according to the aperture value employed to capture the input image.

13. The image processing apparatus according to claim 12, wherein the second calculation unit sets the predetermined amount by which the aperture value is to be virtually changed, such that the smaller the aperture value employed to capture the input image is, the larger the predetermined amount is.

14. The image processing apparatus according to claim 10, wherein the display control unit superimposes a color on the area in the first range or the second range and displays the area on the display apparatus such that the area in the first range or the second range is distinguishable from an area other than the area in the first range or the second range.

15. The image processing apparatus according to claim 14, wherein the display control unit superimposes a color on the area in the first range or the second range and displays the area in the first range or the second range on the display apparatus in a case where the proportion of the number of pixels included in the first range or the second range to the total number of pixels of the input image is less than a predetermined proportion.

16. The image processing apparatus according to claim 10, wherein the display control unit superimposes a color on an area other than the area in the first range or the second range and displays the area on the display apparatus such that the area in the first range or the second range is distinguishable from the area other than the area in the first range or the second range.

17. The image processing apparatus according to claim 16, wherein the display control unit superimposes a color on an area other than the area in the first range or the second range and displays the area on the display apparatus in a case where the proportion of the number of pixels included in the first range or the second range to the total number of pixels of the input image is no less than a predetermined proportion.

18. The image processing apparatus according to claim 10, wherein the first and the second calculation units calculate whether or not a range is within a depth of field from a focus position, based on signals acquired from an image sensor that has a plurality of photoelectric conversion elements in one unit pixel.

19. The image processing apparatus according to claim 10, wherein the first and the second calculation units calculate whether or not a range is within a depth of field by detecting an object distance using light or an ultrasonic wave.

20. The image processing apparatus according to claim 10, wherein the display control unit displays an area in the first range or the second range on the display apparatus based on edge signals of the input image such that the area in the first range or the second range is distinguishable from an area other than the area in the first range or the second range.

21. An image processing method comprising:
calculating, for an input image, a first range that is within a depth of field from a focus position;
calculating, for the input image, a second range that is within a depth of field from the focus position corresponding to an aperture value virtually changed by a predetermined amount from an aperture value employed to capture the input image; and
displaying an area in the first range or the second range on display apparatus depending on an image capturing mode employed to capture the input image, such that the area in the first range or the second range is distinguishable from an area other than the area in the first range or the second range,
wherein in the displaying, in a case where the image capturing mode is an image capturing mode other than an image capturing mode in which the aperture value is manually changeable, an area in the first range is displayed on the display apparatus such that the area in the first range is distinguishable from an area other than the area in the first range.

22. An image processing method comprising:
calculating, for an input image, a first range that is within a depth of field from a focus position;
calculating, for the input image, a second range that is within a depth of field from the focus position corresponding to an aperture value virtually changed by a predetermined amount from an aperture value employed to capture the input image; and
displaying an area in the first range or the second range on display apparatus depending on focus adjustment information employed to capture the input image, such that the area in the first range or the second range is distinguishable from an area other than the area in the first range or the second range,
wherein in the displaying, upon a predetermined period of time elapsing from when the focus position has been changed, an area in the second range is displayed on the display apparatus such that the area in the second range is distinguishable from an area other than the area in the second range.

23. A non-transitory computer-readable storage medium on which a program for enabling a computer to function as each unit of an image processing apparatus is stored, the image processing apparatus comprising:
a first calculation unit for calculating, for an input image, a first range that is within a depth of field from a focus position;
a second calculation unit for calculating, for the input image, a second range that is within a depth of field from the focus position corresponding to an aperture value virtually changed by a predetermined amount from an aperture value employed to capture the input image; and
a display control unit for displaying an area in the first range or the second range on display apparatus depending on an image capturing mode employed to capture the input image, such that the area in the first range or the second range is distinguishable from an area other than the area in the first range or the second range,
wherein, in a case where the image capturing mode is an image capturing mode other than an image capturing mode in which the aperture value is manually changeable, the display control unit displays an area in the first range on the display apparatus such that the area in the first range is distinguishable from an area other than the area in the first range.

* * * * *